United States Patent [19]

Johnson

[11] Patent Number: 4,457,530
[45] Date of Patent: Jul. 3, 1984

[54] CYCLE KICKSTAND ACCESSORY

[76] Inventor: Clyde T. Johnson, PO Drawer 100, Escanaba, Mich. 49829

[21] Appl. No.: 421,962

[22] Filed: Sep. 23, 1982

[51] Int. Cl.³ .............................................. B62H 1/00
[52] U.S. Cl. ................................. 280/293; 248/188.9
[58] Field of Search ............................. 280/293–304, 280/289 G; 248/188.9, 615; 188/5, 6; 135/77, 82; 16/108, 42 R, 42 T

[56] References Cited

U.S. PATENT DOCUMENTS 3,955,829  5/1976  Bussler .......................... 280/293 X

FOREIGN PATENT DOCUMENTS 695836  8/1953  United Kingdom ........... 280/289 G

*Primary Examiner*—John A. Pekar
*Attorney, Agent, or Firm*—Willis B. Swartwout, III

[57] ABSTRACT

In common style cycle kickstands, particularly bicycle kickstands by cycles used and parked on dirt or soft blacktop drives, the weight of the cycle when the stand is in cycle supporting position will cause the kickstand foot to dig into the surface. The cycle will then fall over on its side damaging the cycle and if the cycle was on a blacktop surface, the stand damages that surface also. This problem is overcome by the present invention which is an accessory for the kickstand that is constructed from deformable plastic or rubber. The accessory is provided with a passageway slightly smaller in cross-section than the stand leg and foot so that it can be manually pushed over the kickstand leg and foot frictionally engaging the kickstand leg and foot in a tight fit. The accessory is further provided with a flex section to facilitate pliability for manual application and removal and with a splayed foot surface over the kickstand foot surface diffusing the weight of the cycle over a larger area eliminating the possibility of weight digging the kickstand foot into blacktop or dirt.

6 Claims, 3 Drawing Figures

CYCLE KICKSTAND ACCESSORY

BACKGROUND OF THE INVENTION

The field of the invention is an accessory for a typical or standard cycle kickstand and particularly an accessory device which can be easily applied to conventional cycle kickstands and which will disperse or distribute cycle weight so that the cycle can be parked on soft surfaces such as ground or blacktop without sinking into the surface and tipping over sidewise.

On two wheel bicycles which will not stand alone it has been the custom in the past to mount a kickstand to the left side of the cycle on the frame immediately adjacent to the rear of the cycle from the area of the pedal mounting area. The kickstand included a solid metal cylindrical leg having a foot or ped portion at the end thereof remote from the cycle bent at an obtuse angle relative to the leg. The operation of such a stand is well known and includes a position of said stand leg and foot enabling the cycle operator to lean the cycle to the left on a surface creating a tripod type position in which the front and back wheels and kickstand foot are in simultaneous contact with the surface and the cycle will, therefore, stand in a stable manner.

However, when the cycle is parked in such a manner on a soft surface such as earth or blacktop the weight of the cycle caused the ped portion of the stand to dig into the surface. The cycle would then lean further to the side than desirable and eventually fall over on its side. This has created an increasing problem of inconvenience and cycle damage as the popularity of dirt bikes and use of bicycles of all types on dirt surfaces has achieved increasing popularity.

SUMMARY OF THE INVENTION

The present invention is a cycle kickstand accessory which can be slideably mounted on and surrounding the leg and ped portion of a common style kickstand. The accessory is provided with a centrally disposed passageway and is made from a deformable material such as certain varieties of plastic or rubber allowing the accessory to frictionally engage the leg and ped portion of the stand within the internal passageway in the accessory while maintaining its external form. The ped or foot portion of the accessory has a substantially longer surface contacting area such that cycle weight is dispersed over a sufficient surface area. This construction of the accessory distributes cycle weight over a broader area than the ped portion of the kickstand leg whereby cycle weight will not cause the ped portion of the cycled leg or the accessory to dig into a soft surface such as earth or blacktop allowing the cycle to tip over sideways.

A general object of the present invention is to provide an accessory unit for a cycle kickstand having a leg provided with a ground engaging foot portion at an obtuse angle to said leg, the accessory having a leg and ped portion at the same or substantially similar obtuse angle relative to each other and the accessory having a centrally disposed passageway commencing at the end thereof remote from the accessory ped portion and extending through the longitudinal centerline axis of said accessory leg and projecting into the ped portion along the longitudinal centerline axis thereof, the cross-sectional dimension of said passageway being slightly smaller than the cross-sectional dimension of the cycle kickstand leg and foot portion. The accessory device is made from a deformable material and the passageway in the leg and foot portion of the accessory have substantially the same obtuse angular relation to each other as the kickstand leg and foot.

It is a further object to provide an accessory device as previously described wherein the leg portion of the accessory is provided with a longitudinally centrally disposed flex grooving and baffeling to enable the accessory to be more readily slideably mounted over the kickstand leg and foot.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made, therefore, to the claims herein for interpreting the scope of the invention.

DESCRIPTION OF THE PREFERRED EMBODIMENT

Figure 1:
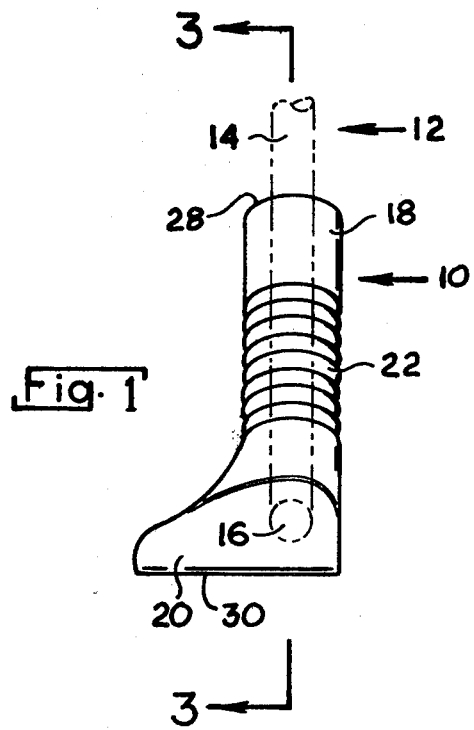
FIG. 1 is a front vertical plan view of a device embodying the present invention, with shadow view of the kickstand leg and foot on which it is mounted.

Referring now to the drawings there is shown an accessory device generally identified by the numeral 10. Device 10 is molded from a relatively hard, but still deformable plastic or rubber.

Figure 2:
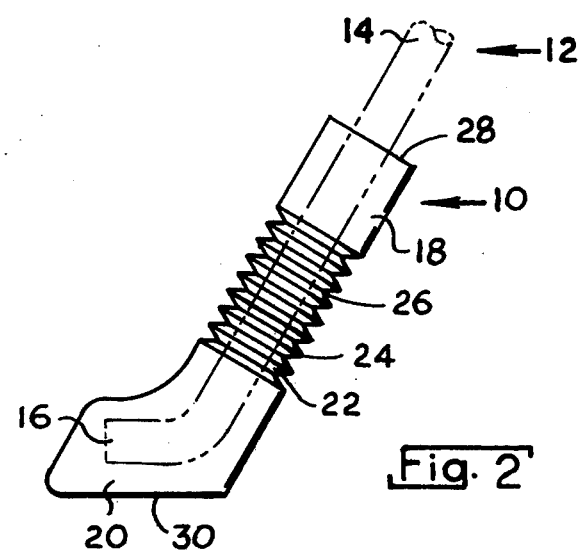
FIG. 2 is a side elevational view similar to FIG. 1.

Device 10 is adapted to fit over a typical bicycle kickstand 12. Kickstand 12 includes a elongated leg section 14 having disposed at one extremity a foot section 16. Foot section 16 is disposed at an obtuse angle relative to leg section 14. In FIGS. 1 and 2 kickstand 12 and leg section 12 and foot section 14 are depicted in shadow to disclose the placement thereof when the device 10 is in place on the stand 12.

Device 10 is a unitary molded deformable body having an elongated leg portion 18 and a foot portion 20 disposed at one extremity of leg portion 18. Foot portion 20 is disposed at an obtuse angle relative to leg portion 18 as is clearly depicted in FIGS. 2 and 3 of the drawings. The obtuse angle of foot section 16 relative to leg section 14 and of foot portion 20 relative to leg portion 18 are intended to be substantially the same.

It should be noted at this point that kickstand 12 and leg section 14 and foot section 16 are formed from an elongated solid metal bar disclosed to be geometrically circular in vertical cross-section through the longitudinal centerline axis of stand 12. However, it should also be understood that stand 12 and sections 14 and 16 could be of a differing geometric cross-sectional configuration or could be formed from angle or channel materials and might even be hollow depending upon material strength without the device 10 departing from the spirit of the invention or the scope of the appended claims.

In its preferred form the leg portion 12 is provided with a flex section 22. Flex section 22 consists of a series of alternating ridges 24 and grooves 26 molded into section 22. Section 22 is disposed axially centrally relative to leg portion 18 between foot portion 20 and extremity 28 of leg portion 18.

Note that foot portion 20 increases in vertical and horizontal cross-sectional dimension as it extends away from leg portion 18 resulting in a splayed exterior surface 30.

Figure 3:
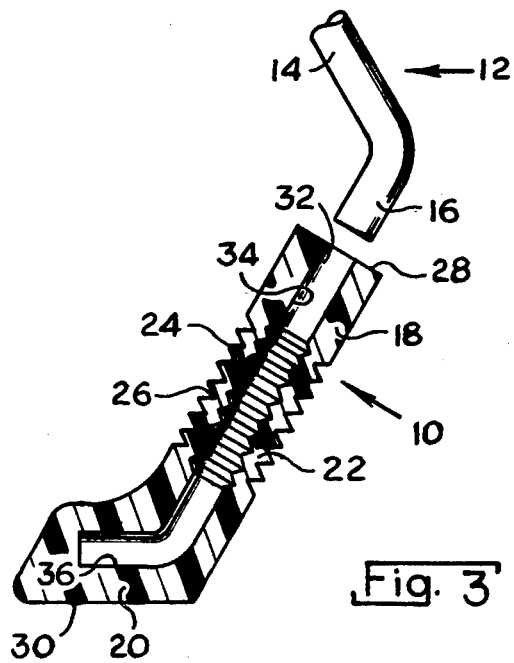
FIG. 3 is a vertical cross-sectional view of the device shown in FIG. 1, taken along line 33 of FIG. 1, looking in the direction of the arrows and showing in exploded relationship a portion of a cycle kickstand leg and foot.

Device 10 is provided with a passageway generally identified in FIG. 3 of the drawings by the numeral 32. Passageway 32 extends from extremity 28 longitudinally coaxially through device 10 into foot portion 20, and includes a passageway leg 34 and passageway foot 36. Passageway foot 36 is disposed at substantially the same obtuse angle relative to passageway leg 34 as the obtuse angle of foot section 16 to leg section 14 of kickstand 12. The passageway 32 in vertical cross-section through its longitudinal axis is of the same geometric shape as the geometric shape of a vertical cross-section through the longitudinal axis of kickstand 12.

In the preferred embodiment, in order to insure a tight fit of device 10 around stand 12, the area of the geometric configuration of the vertical cross-section through passageway 32 is slightly less than the area of the geometric configuration of the vertical cross-section through stand 12.

It can be easily seen that device 10 can be pushed around and over kickstand 12 which will slide under manual pressure into passageway 32. Flex section 22 facilitates the sliding on of device 10 where the material of device 10 is a less pliable or deformable type.

Since splayed surface 30 disperses cycle weight over a broader area than foot section 16, the purposes of the invention are accomplished.

I claim:

1. An accessory device for a kickstand including a kickstand leg, one extremity of said leg being provided with a foot section said device being elongated and constructed of deformable material and having a unitary body including an elongated leg portion, a foot portion and a flex section intermediate said leg portion and said foot portion along the longitudinal centerline axis of said device, the foot portion disposed at an obtuse angle relative to said leg portion and flex section, said device being further provided with longitudinal axially centrally disposed passageway extending through the leg portion and flex section and into the foot portion for receiving the kickstand leg and foot.

2. The structure as set forth in claim 1, wherein said foot portion is provided with a splayed exterior surface remote from said leg portion.

3. The structure as set forth in claim 1, wherein said passageway is geometrically shaped in vertical cross-section therethrough in the same configuration as the geometric shape in vertical cross-section through said kickstand leg and foot.

4. The structure as set forth in claim 3, wherein the area of the geometric configuration in cross-section of said passageway is less than the area of the geometric configuration in cross-section of said kickstand leg and foot.

5. An accessory device for a kickstand including a kickstand leg, one extremity of said leg being provided with a foot section disposed at an obtuse angle to said leg, said device having a unitary body constructed of deformable material and including an elongated leg portion and a foot portion at one extremity of said leg portion disposed at an obtuse angle relative to said leg portion, said leg portion being provided with a flex section axially intermediate the one extremity of said leg portion where the foot portion is disposed and a second extremity of said leg portion longitudinally axially remote from said foot portion, said foot portion having a splayed exterior surface remote from said leg portion, said device being further provided with a longitudinal axial passageway coaxial with the longitudinal centerline axis of said device extending through said leg portion and into the foot portion for receiving the kickstand leg and foot, said passageway geometrically shaped in vertical cross-section therethrough in the same configuration as the geometric shape in vertical cross-section through said kickstand leg and foot.

6. The structure as set forth in claim 5, wherein the area of the geometric configuration in vertical cross-section of said passageway is less than the area of the geometric configuration in vertical cross-section of said kickstand leg and foot.

* * * * *